(12) United States Patent
Tassinari et al.

(10) Patent No.: US 7,963,265 B2
(45) Date of Patent: Jun. 21, 2011

(54) TUNABLE AIR INTAKE SYSTEM

(75) Inventors: Scott A. Tassinari, Norwich, VT (US);
Steven M. Tassinari, Meridan, NH (US)

(73) Assignee: Moto Tassinari, Inc., West Lebanon, NH (US)

( * ) Notice: Subject to any disclaimer, the term of this patent is extended or adjusted under 35 U.S.C. 154(b) by 0 days.

(21) Appl. No.: 12/592,984

(22) Filed: Dec. 7, 2009

(65) Prior Publication Data

US 2010/0147244 A1    Jun. 17, 2010

Related U.S. Application Data

(60) Provisional application No. 61/201,043, filed on Dec. 5, 2008.

(51) Int. Cl.
*F02M 35/10* (2006.01)
(52) U.S. Cl. .................................. 123/184.56
(58) Field of Classification Search ............. 123/198 E, 123/184.21, 566, 198 D, 470, 509, 195 C, 123/195 A, 184.22, 184.23; 55/385.3, 475, 317, DIG. 28, 462, 337, 352, 385.6; 261/71; D12/400

See application file for complete search history.

(56) References Cited

U.S. PATENT DOCUMENTS

| | | | |
|---|---|---|---|
| 4,457,267 A * | 7/1984 | Gorr | 123/184.54 |
| 4,913,855 A | 4/1990 | Panzica | |
| 5,707,560 A | 1/1998 | Nevin | |
| 5,971,026 A | 10/1999 | Beran | |
| 6,042,088 A | 3/2000 | Wang | |
| 2003/0019456 A1 | 1/2003 | Ayton | |
| 2003/0062013 A1 | 4/2003 | Kino et al. | |
| 2008/0195298 A1 | 8/2008 | Delgado | |

* cited by examiner

*Primary Examiner* — Michael Cuff
*Assistant Examiner* — Keith Coleman
(74) *Attorney, Agent, or Firm* — Devine, Millimet & Branch; Paul C. Remus; Raymond I. Bruttomesso, Jr.

(57) ABSTRACT

An air intake system for a two-stroke or four-stroke internal combustion engine that is tunable through the use of interchangeable velocity stacks.

7 Claims, 7 Drawing Sheets

TUNABLE AIR INTAKE SYSTEM

CROSS-REFERENCE TO RELATED APPLICATIONS

The present application claims the benefit of Provisional Patent Application Ser. No. 61/201,043 filed Dec. 5, 2008, which is incorporated herein by reference.

TECHNICAL FIELD OF THE INVENTION

The present invention relates generally to an air intake system for a two-stroke or four-stroke internal combustion engine. More specifically, it relates to an air intake system that is tunable through the use of interchangeable velocity stacks.

BACKGROUND OF THE INVENTION

Many smaller two-stroke and four-stroke internal combustion engines typically use an air intake boot to connect the air box to the carburetor or the throttle body if it is a fuel injected engine (collectively herein the "carburetor/throttle body"). As is shown in FIG. 1, an intake boot 01 of the prior art has a first end opening 02 with a larger cross-section that connects to the air box (not shown) and a second end opening 03 with a smaller cross-section that connects to the carburetor/throttle body (not shown). The intake boot 01 allows air to flow from the air box to the carburetor/throttle body.

The power characteristics of an engine are dependent on the velocity and volume of the air leaving the second end opening 03 of the intake boot 01 and entering the carburetor/throttle body (the "air flow"). For example, a higher velocity air flow will, in general, result in higher torque.

The problem with the intake boots of the prior art is that they do not provide a simple means for easily adjusting the velocity or volume of the air flow. It requires a given intake boot to be replaced with another intake boot with a different configuration, which different configuration causes a higher or lower velocity air flow.

It is an object of the present invention to provide a tunable air intake system in which the velocity and volume of the air flow can be easily adjusted through the use of interchangeable velocity stacks.

SUMMARY

The present invention is an air intake system for a two-stroke or four-stroke internal combustion engine that is tunable through the use of interchangeable velocity stacks. It includes an intake boot with a larger opening at the end that connects to the air box and a smaller opening at the end that connects to the carburetor/throttle body. The smaller opening is disposed removably to connect easily to one end of each of multiple interchangeable velocity stacks. When so connected, the funnel-shaped end of a velocity stack extends into the intake boot.

BRIEF DESCRIPTION OF THE DRAWINGS

The invention, as well as its advantages, may be better understood by reading the following detailed description of preferred embodiments and the following drawings in which.

DETAILED DESCRIPTION OF PREFERRED EMBODIMENTS

Figure 2:
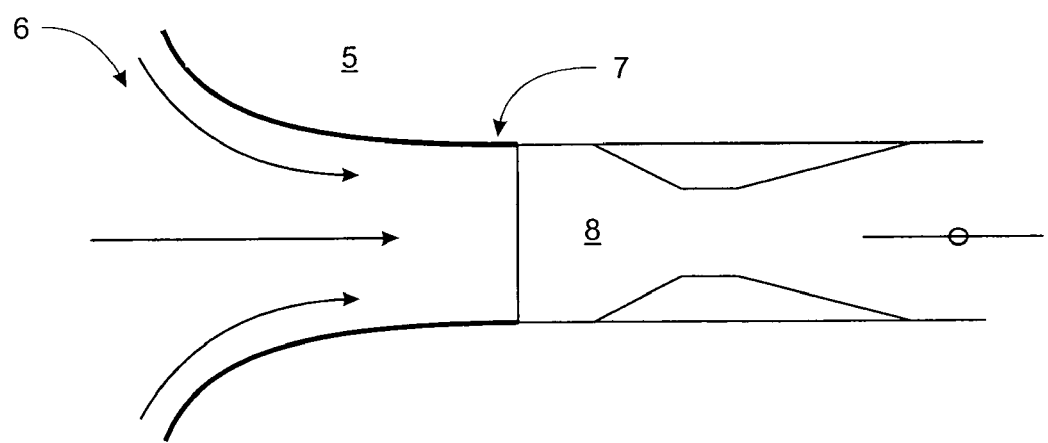
FIG. 2 shows a diagram of air entering a velocity stack.
Figure 3:
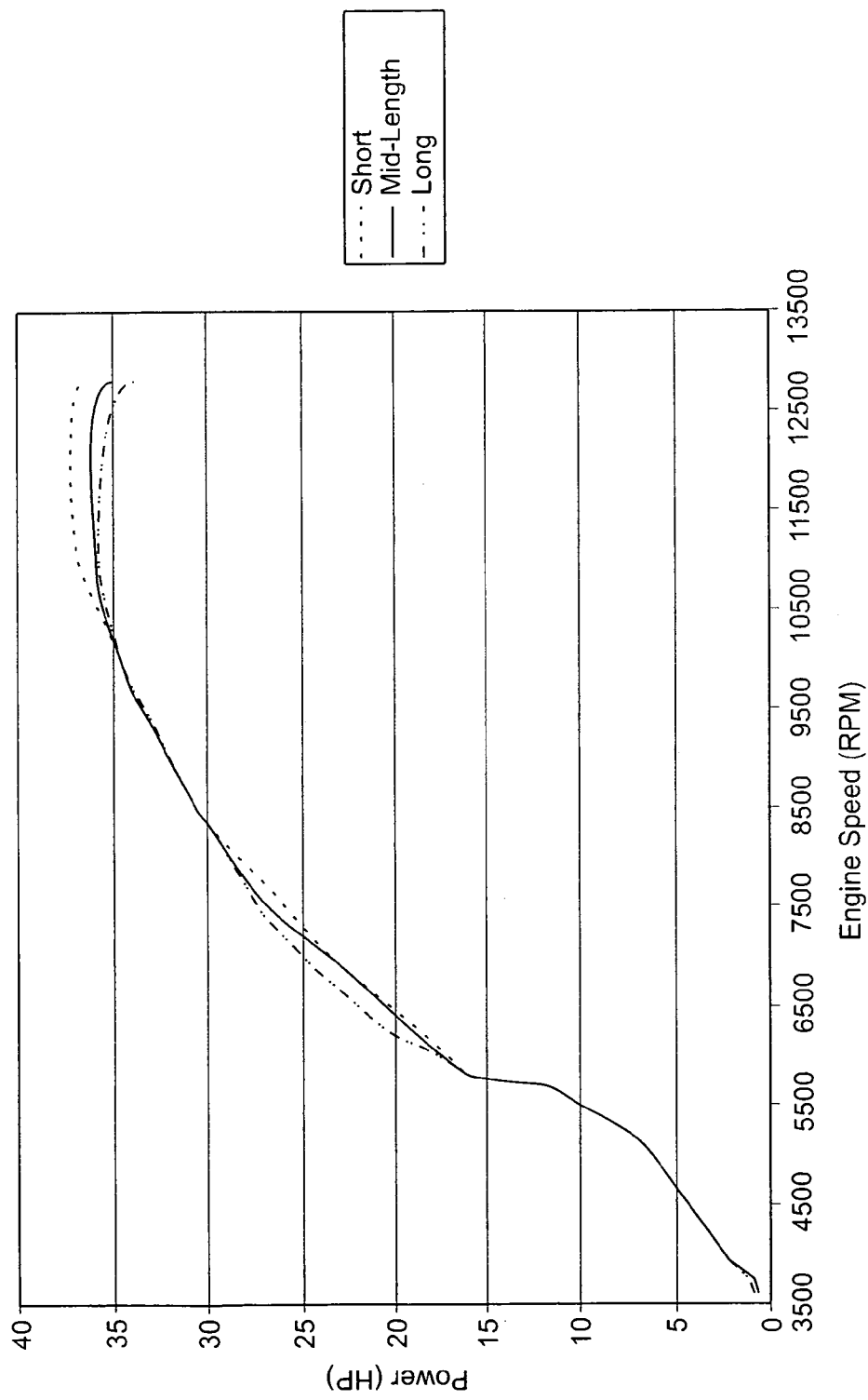
FIG. 3 is a graph of the change in engine performance with different length velocity stacks.

The present invention is a tunable air intake system comprising an air intake boot with interchangeable velocity stacks that extend into the air intake boot wherein the velocity stacks can be easily interchanged with simple tools. A velocity stack is a trumpet-shaped device that is added to the air entry of an engine's fuel system. As shown in FIG. 2, from the exterior, a velocity stack 5 is a generally cylindrical device (although the generally cylindrical shape may be altered to accommodate the architecture of a given air intake system) with one end 6 funnel-shaped. The other end 7 is connected to a carburetor/throttle body 8 such that air flows into the funnel-shaped end 6, through the velocity stack 5, the interior of which may be cylindrical or may include an obstruction and into the carburetor/throttle body 8. It is designed to:

1. Allow smooth and even entry of air into the velocity stack with the air flow adhering to the walls of the velocity stack;

2. Modify the dynamic tuning range of the air intake system by functioning as a small reverse megaphone that can extend the duration of pulses within the tract; and 3. Alter the dynamic tuning speed by including extra length. A velocity stack may be customized in a number of ways, including changing its length and changing its interior configuration. FIG. 3 is a graph of change in engine performance with different length velocity stacks.

Figure 1:
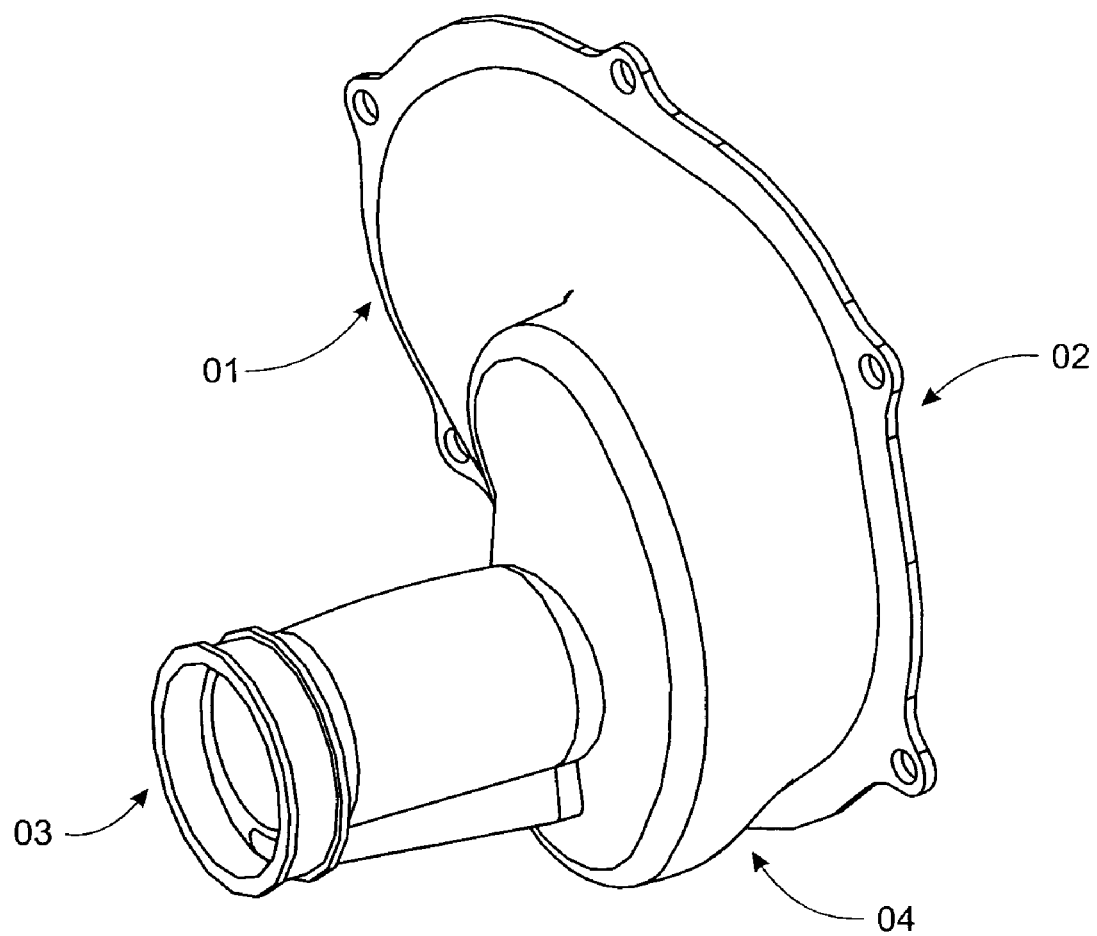
FIG. 1 shows a perspective view of an air intake boot of the prior art.
Figure 4:
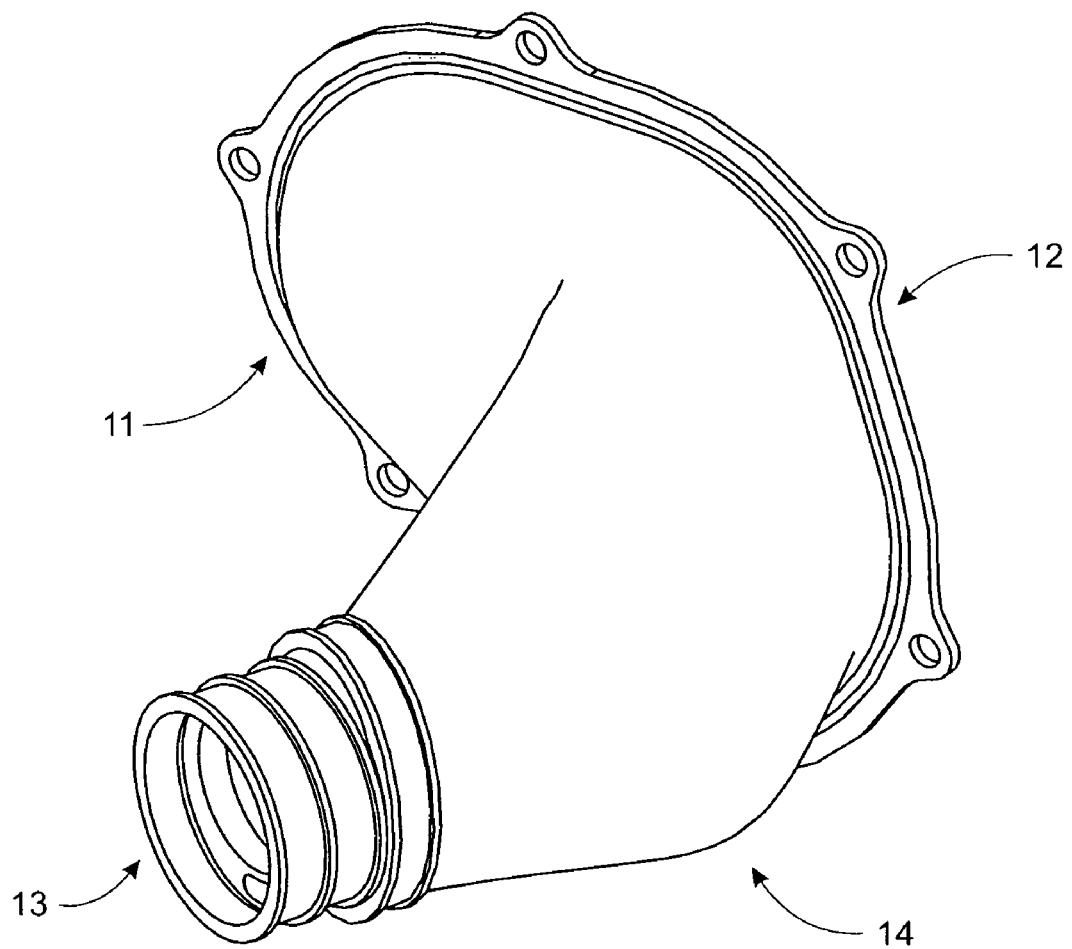
FIG. 4 shows a perspective view of a preferred embodiment of an air intake boot of the present invention.

As is shown in FIG. 4, a preferred embodiment of the present invention includes an air intake boot 11 that has a first end opening 12 of a larger cross-section that connects to an air box and a second end opening 13 that connects to a carburetor/throttle body. The air intake body is preferably injection molded out of thermoplastic urethane ("TPU") or a material with similar characteristics known to those skilled in the art. The body 14 of the air intake boot 11 has significantly more volume than the body 04 of an air intake boot 01 of the prior art, as shown in FIG. 1.

Figure 5:
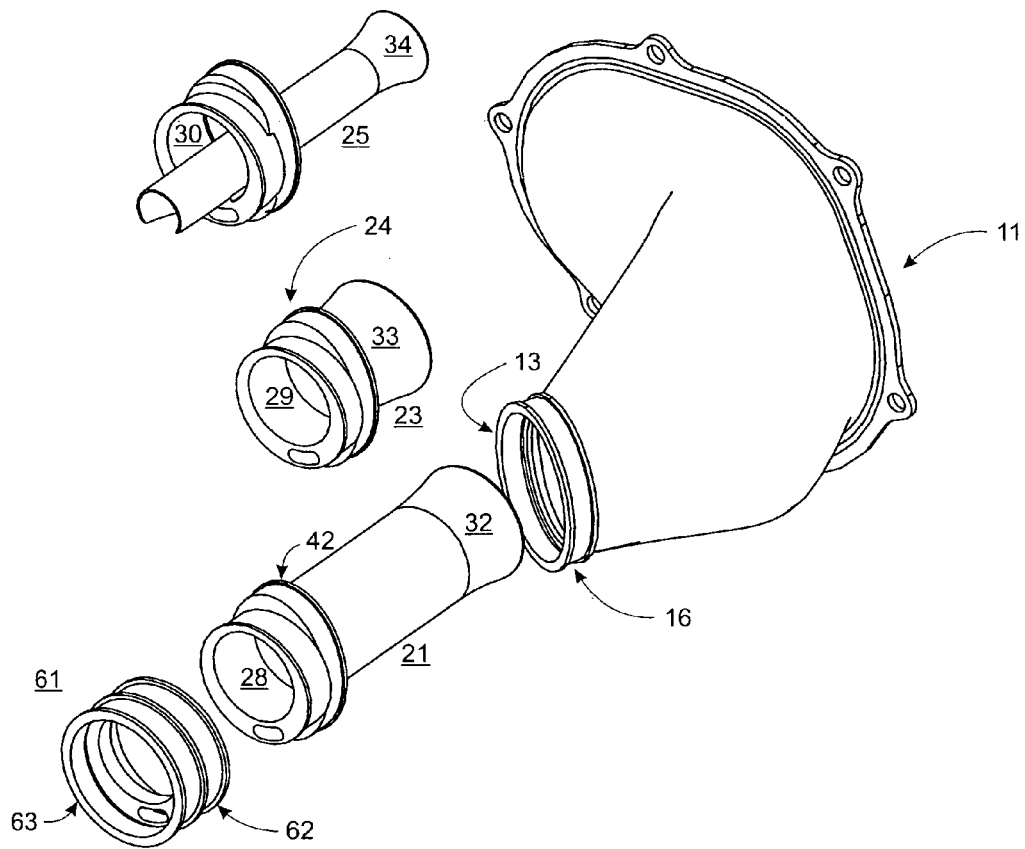
FIG. 5 shows a perspective view of the preferred embodiment of FIG. 4 and a series of interchangeable velocity stacks.

As shown in FIG. 5, the second end opening 13 of the air intake boot 11 has a flange 16 around its exterior surface. The second end opening 13 is disposed removably to connect to each of multiple velocity stacks 21, 23, 25. Each of the velocity stacks 21, 23, 25 has a first end 28, 29, 30, respectively, and a second end 32, 33, 34, respectively, that is funnel-shaped. Each of the velocity stacks 21, 23, 25 has a different configuration. The first interchangeable velocity stack 21 is long, the second velocity stack 23 is shorter, and the third velocity stack 25 has a custom design. A velocity stack can be custom designed to achieve various combinations of power characteristics based on the velocity and volume of the air flow through the stack. The velocity stacks are also preferably molded out of TPU or a material with similar characteristics known to those skilled in the art.

The first end 28, 29, 30 of each of the velocity stacks 21, 23, 25, respectively, has means for removably connecting the velocity stack to the second end opening 13 of the air intake boot 11. Velocity stack 21 is illustrative of the means for connecting each of the velocity stacks. The first end 28 of the velocity stack 21 has a lip 42 around its exterior surface such that when the first end 28 is inserted into the second end opening 13 of the air intake boot 11, the second end 32 extends through the second end opening 13 and into the air intake boot 11 and the lip 42 slips over the flange 16 and is held in place by a hose clamp (not shown) or other holding means known to those skilled in the art.

The first end 28 of velocity stack 21, which is again illustrative of all the velocity stacks has, in turn, means for removably connecting to a carburetor/throttle body through the use of a ring 61 made of TPU or a material with similar characteristics known to those skilled in the art. A first side 62 of ring 61 engages the first end 28 of the velocity stack 21 and a second side 63 of the ring engages the carburetor/throttle body. The first side 62 and the second side 63 of the ring are held in place by hose clamps (not shown) or other holding means known to those skilled in the art.

In operation, the ring 61 can easily be disengaged with simple tools from the carburetor/throttle body and first end 28 of the velocity stack 21. The lip 42 of velocity stack 21 can also easily be disengaged with simple tools from the rim 16 of the air intake boot so that the velocity stack 21 can be removed. A different velocity stack, for example velocity stack 23 or 25, can then be substituted with simple tools, as described above, for the removed velocity stack 21. The velocity stack to be substituted can be chosen to increase or decrease the velocity and volume of the air flow to the carburetor/throttle body, thereby tuning the engine's power characteristics to better suit the terrain or the rider's skill level.

Figure 6:
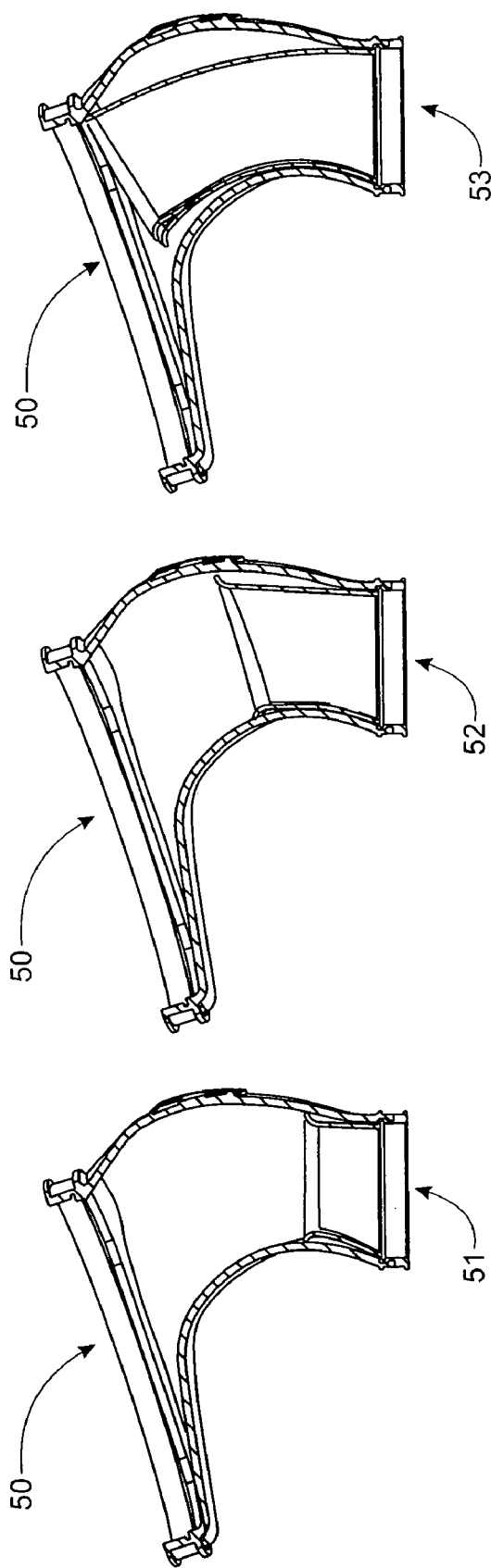
FIG. 6 shows a cross-section view of another preferred embodiment of an air intake boot and a series of interchangeable velocity stacks of the present invention.

FIG. 6 is a cross-section view of another embodiment of the present invention. Air intake boot 50 is shown removably connected to different velocity stacks. It is removably connected to short velocity stack 51, mid-length velocity stack 52 and long velocity stack 53.

Figure 7:
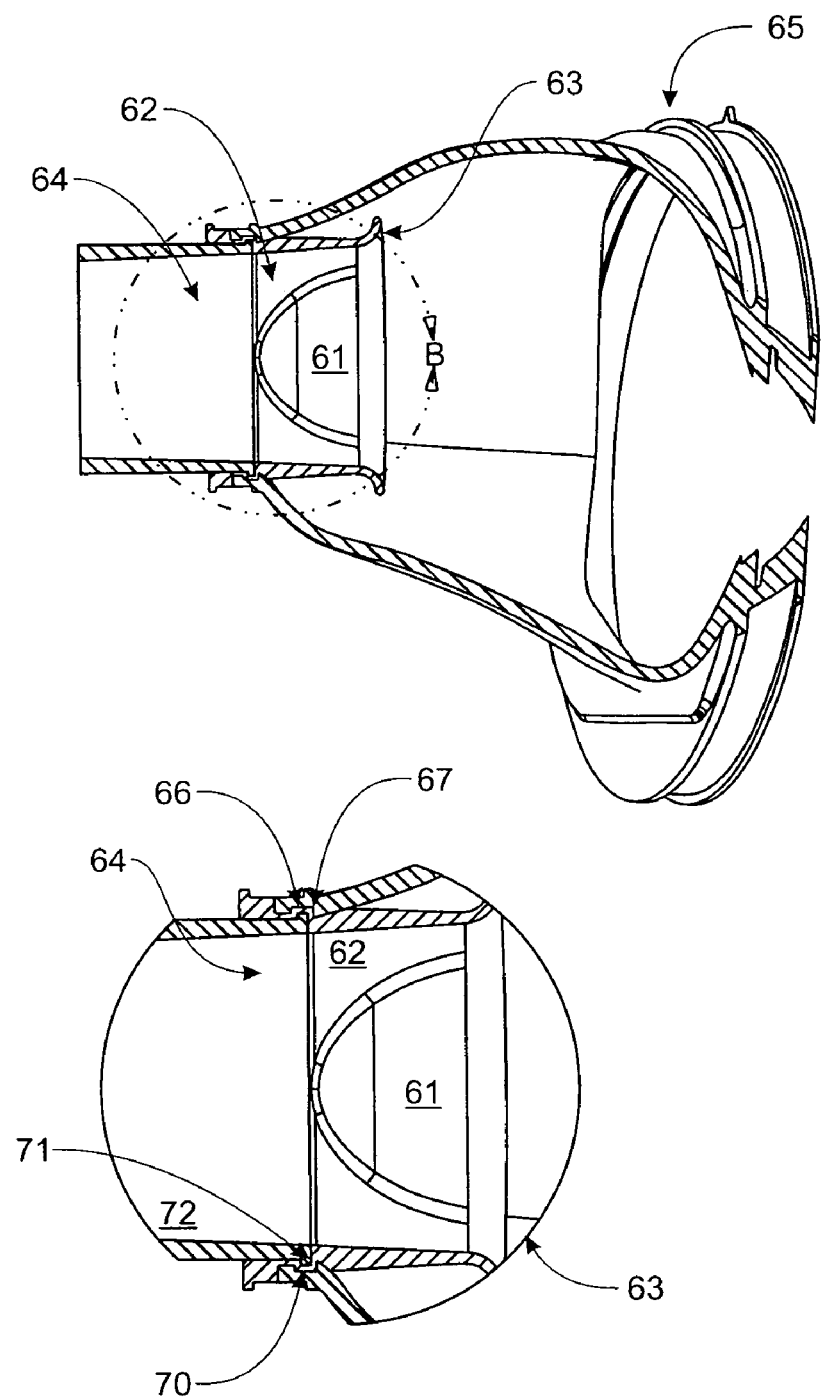
FIG. 7 shows a detailed cross-section view of an air intake boot, carburetor/throttle body interface of the preferred embodiment of FIG. 6.

FIG. 7 is a cross-section view of the velocity stack, carburetor/throttle body interface of this embodiment. Velocity stack 61 has a first end 62 and a second end 63 that is funnel-shaped. The first end 61 has a means for removably connecting the velocity stack 61 to an opening 64 in an air intake boot 65.

The first end 62 of the velocity stack 61 has a flange 66 around its exterior surface. When the second end 63 of the velocity stack 61 is inserted through the opening 64 and into the air intake boot 65, the flange 66 fits into an indentation 67 around the interior surface of the opening 64 in the air intake boot 65.

The first end 62 of the velocity stack 61 also includes means for removably connecting the velocity stack 61 to a carburetor/throttle body. As shown in FIG. 6, the first end 62 of the velocity stack 61 has an indentation 70 around its interior surface such that a flange 71 around the exterior surface of a carburetor/throttle body extension 72 fits into the indentation 70 when the carburetor/throttle body extension 72 is inserted into the first end 62 of the velocity stack 61.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A tunable air intake system comprising,
   an intake boot having a first end opening and a second end opening, wherein the first end opening has a larger cross-section than the second end opening,
   one or more interchangeable velocity stacks, each velocity stack having a first end and a second funnel-shaped end such that removably connecting the first end of a velocity stack to the second end opening in the intake boot causes the second funnel-shaped end of the velocity stack to extend through the second end opening in the intake boot into the intake boot.

2. The system of claim 1 wherein the intake boot is injection molded out of thermoplastic urethane.

3. A tunable air intake system comprising,
   an intake boot having a first end opening and a second end opening, wherein the first end opening has a larger cross-section than the second end opening,
   one or more interchangeable velocity stacks, each velocity stack having a first end, a length and a second funnel-shaped end,
   means for removably connecting the first end of a velocity stack to the second end opening in the intake boot such that the second funnel-shaped end of the velocity stack extends through the second end opening of the intake boot into the intake boot.

4. The system of claim 3 wherein the means for removably connecting the first end of a velocity stack to the second end opening in the intake boot further comprises
   a flange on an exterior surface of the second end opening in the intake boot, and
   a lip on the exterior surface of the first end of the velocity stack such that the lip slips over the flange on the exterior surface of the second end opening in the intake boot when the second end of the velocity stack is inserted through the second end opening in the intake boot into the intake boot.

5. The system of claim 4 further comprising a ring to connect the first end of a velocity stack to a carburetor/throttle body.

6. The system of claim 3 wherein the means for removably connecting the first end of a velocity stack to the second end opening in the intake boot further comprises
   a flange around an exterior surface of the first end of the velocity stack, and
   an indentation around an interior surface of the second end opening in the intake boot such that the flange fits into the indentation when the second end of the velocity stack is inserted through the second end opening in the intake boot into the intake boot.

7. The system of claim 6 further comprising
   an indentation around an interior surface of the first end of a velocity stack, disposed to fit over a flange on an exterior surface of an extension of a carburetor/throttle body.

* * * * *